Jan. 26, 1932.  D. A. GRANDINETTI  1,842,982
FRUIT AND VEGETABLE JUICE EXPRESSER
Filed Dec. 20, 1929
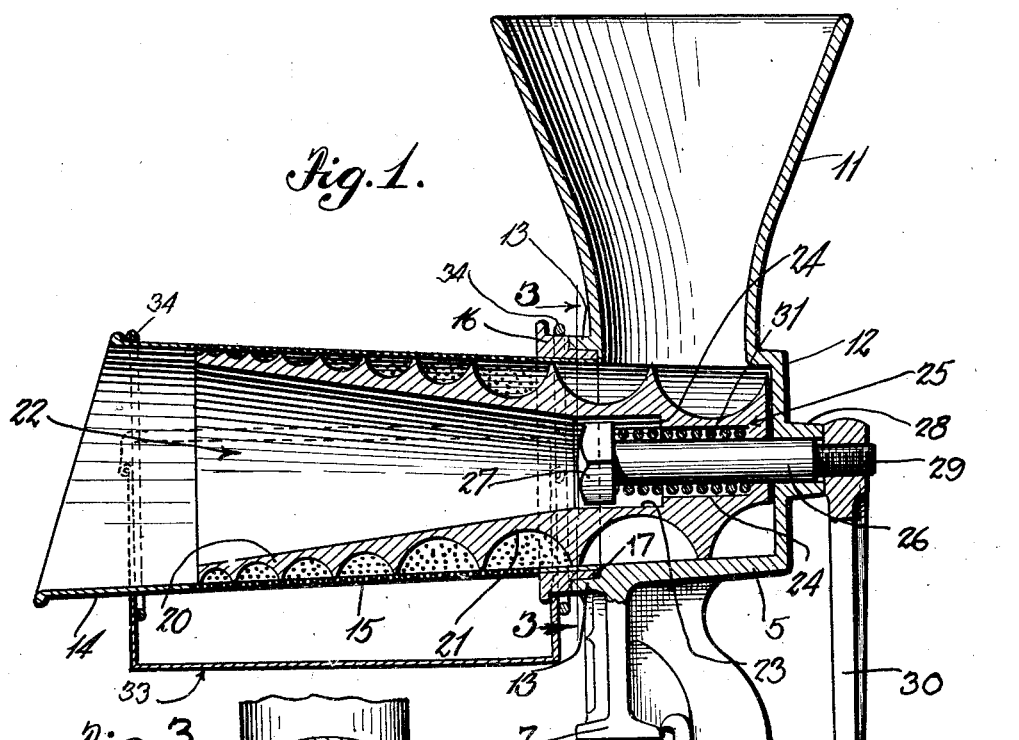
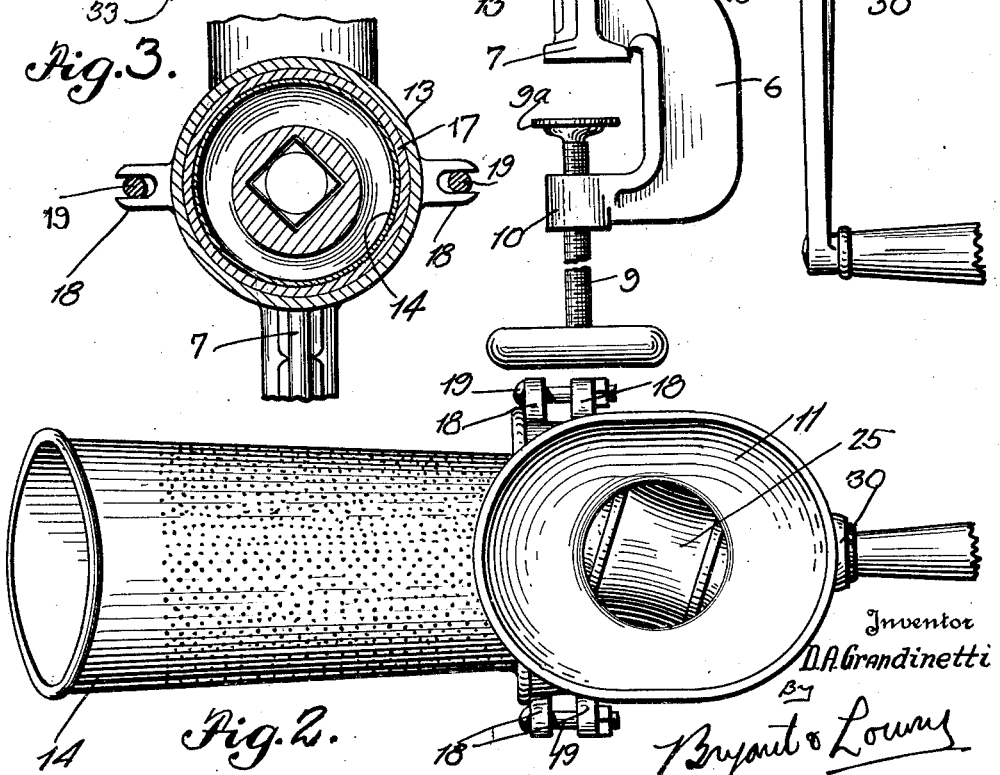
Inventor
D. A. Grandinetti
By Bryant & Lowry
Attorneys Patented Jan. 26, 1932

1,842,982

UNITED STATES PATENT OFFICE

DOMINICK A. GRANDINETTI, OF SYRACUSE, NEW YORK

FRUIT AND VEGETABLE JUICE EXPRESSER

Application filed December 20, 1929. Serial No. 415,452.

This invention relates to certain new and useful improvements in fruit and vegetable juice expressers.

The primary object of the invention is to provide a device for expressing or extracting juice from fruit and vegetables wherein a perforated conical screen or casing having a fruit or vegetable hopper communicating with the smaller end thereof houses a tapered worm or feed screw tensioned in a direction toward its smaller end with spiral grooves in the feed screw of greater area at the smaller end and gradually decreasing outwardly toward the larger end whereby fruit or vegetables fed forwardly through the perforated casing move into the spiral pocket of lesser area but of increased length to permit the escape at the enlarged outer end of the feed screw and casing of the expressed fruit or vegetables, the feed screw being tensioned in a direction toward its smaller end and movable outwardly against spring tension thereon by compacting of the expressed fruits or vegetables in the screw pocket and continuous feeding action of the screw.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a vertical longitudinal sectional view of a fruit and vegetable juice expresser constructed in accordance with the present invention;

Figure 2 is a top plan view of the same; and

Figure 3 is a vertical cross sectional view taken on line 3—3 of Figure 1.

In fruit and vegetable juice expressers of the general type disclosed in this application, it has heretofore been customary to provide a perforated tapering casing housing a tapering feed screw with the smaller ends of the casing and feed screw being forwardly disposed away from the receiving hopper with spring tension on the feed screw to effect retraction thereof in the casing for the escape of expressed fruits and vegetables at the outer end of the casing. In such devices, it has been found that the expressed fruit and vegetables will become packed in the smaller convolutions or thread grooves of the feed screw at the outer end of the tapering screw which prevents the supply or feeding of additional fruit and vegetables into the packed grooves of the feed screw and that the latter will not be retracted against spring pressure thereon for the escape of the expressed fruit and vegetables. As disclosed in the present application, the tapering of the perforated casing and feed screw is reversed, the smaller ends of the casing and feed screw being located adjacent the receiving opening at the lower end of the feed hopper while the larger ends thereof are spaced outwardly. Also, the feed screw being of tapering form with the smaller end disposed adjacent the opening of the feed hopper, the spring associated therewith operates normally to draw the feed screw in an inward direction. The convolutions or grooves in the feed screw are relatively large at the smaller inner end and gradually diminish in area toward the outer end, but increase in length so that fruit or vegetables fed forwardly by the feed screw will cause the latter to be moved forwardly or outwardly against spring tension thereon for the escape of expressed fruits and vegetables at the outer end of the perforated casing.

Referring more in detail to the accompanying drawings, there is illustrated a fruit and vegetable juice extractor comprising a casing 5 carrying a depending arm 6 that is provided with an upper rigid clamp 7 and a lower screw clamp 9 and 9a working through the bearing 10 and cooperating with rigid clamp 7 for mounting the casing upon a table or other support. The casing 5 is of cylindrical form in cross-section and at its upper side carries an upwardly and outwardly flaring feed hopper 11 integral therewith and of a form in plan view as illustrated in Figure 2. The rear side of the casing 5 is closed by an end wall 12 and the open forward side of the casing 5 carries an annular flange 13.

An outwardly and forwardly flaring casing 14 perforated over a certain area thereof as indicated at 15 has the inner smaller end thereof enclosed by and secured to a mounting ring 16. The mounting ring 16 is provided with a reduced annular collar 17 to seat in the flange 13 on the body 5 as shown in Figs. 1 and 3, cooperating pairs of lugs 18 at diametrically opposite sides of the flange 13 and the ring 16 receiving fastening bolts 19 for holding the casing 14 in assembled relation to the casing 5.

An outwardly flaring conical feed screw 20 is located in the casings 5 and 14, the smaller end thereof being located in the casing 5 and the larger end in the casing 14, the feed screw having outer spiral grooves 21 larger at the inner smaller end and of gradually decreasing area in an outwardly or forward direction. The feed screw 20 is of hollow formation embodying an outwardly flaring opening 22 that terminates adjacent the inner end of the feed screw in a rectangular pocket 23 having a shoulder 24 at its inner end and continuing from said shoulder with a cylindrical pocket 24, the inner end of which pocket 24 is closed by an inner end wall 25. The bolt 26 is provided at its outer end with a polygonal head 27 that is freely slidable but non-rotatable in the rectangular pocket 23, the bolt 26 extending through the cylindrical pocket 24, an opening in the end wall 25 of the feed screw and through a bearing 28 carried by the end wall 12 of the casing 5 with the projecting end thereof threaded as at 29 to receive the crank handle 30. A coil spring 31 surrounds the bolt 26 between the polygonal head 27 and end or bottom wall 25 of the pocket 24 for normally tensioning the feed screw 20 in an inward or rearward direction. A drip pan 33 is removably attached to the casing 14 by curved spring arms 34.

In the operation of the device, fruit or vegetables to have the juice expressed therefrom are fed to the receiving hopper 11 and into the casing 5 to be carried forwardly through the casing 14 by the feed screw 20. The fruit and vegetables are expressed while being fed forwardly by the outwardly flaring feed screw by passage through the spiral grooves 21, the compressed fruit or vegetables in the larger spiral grooves 21 being distributed over the smaller and longer spiral groove toward the outer end of the feed screw, thereby eliminating undue packing of the expressed fruit or vegetables in the smaller spiral grooves with the result that the feed screw 20 will move forwardly against the tension of the spring 21 to permit the escape at the outer end of the casing 14 of the expressed fruit or vegetables. The feed screw being normally tensioned in an inward direction, forces the fruit or vegetables against the perforated portion 15 of the casing 14 to permit juices extracted therefrom to percolate through the perforations 15. The method of assembly will at once be obvious from an inspection of Figure 1.

While there is herein shown and described the preferred embodiment of the present invention, it is nevertheless to be understood that minor changes may be made therein without departing from the spirit and scope of the invention as claimed.

I claim:—

In a juice expressing machine of the character described, a perforated casing, a feed screw therein, said casing and feed screw flaring outwardly, the screw being hollow from the outer end and having at its inner end a polygonal pocket terminating in a cylindrical pocket, a bolt supporting the screw with a polygonal head in the polygonal pocket permitting sliding movement on the bolt and preventing rotation thereof, and a spring surrounding the bolt between the head and inner end of the screw for normally tensioning the screw in an inward direction.

In testimony whereof I affix my signature.

DOMINICK A. GRANDINETTI.